(12) United States Patent
Galer et al.

(10) Patent No.: US 8,703,217 B2
(45) Date of Patent: Apr. 22, 2014

(54) METHODS FOR RAPID PRODUCTION AND USAGE OF BIOGENERATED FLAVORS

(75) Inventors: Chad D. Galer, Glenview, IL (US);
James Moran, Antioch, IL (US);
Benjamin E. Dias, Chicago, IL (US);
Mary Doyle, Chicago, IL (US);
Orlando Herrera, Evanston, IL (US);
Shaia L. Anderson, Des Plaines, IL (US); Meghan A. McIlroy, Des Plaines, IL (US)

(73) Assignee: Kraft Foods Group Brands LLC, Northfield, IL (US)

( * ) Notice: Subject to any disclaimer, the term of this patent is extended or adjusted under 35 U.S.C. 154(b) by 772 days.

(21) Appl. No.: 11/394,754

(22) Filed: Mar. 31, 2006

(65) Prior Publication Data

US 2007/0231429 A1    Oct. 4, 2007

(51) Int. Cl.
*A23C 9/12*    (2006.01)

(52) U.S. Cl.
USPC ........................................................... 426/36

(58) Field of Classification Search
USPC ............................................................. 426/7
See application file for complete search history.

(56) References Cited

U.S. PATENT DOCUMENTS

| | | |
|---|---|---|
| 3,048,490 A | 8/1962 | Lundstedt |
| 3,100,153 A | 8/1963 | Knight |
| 3,780,182 A | 12/1973 | Johnson et al. |
| 3,840,672 A | 10/1974 | Kasik et al. |
| 3,975,544 A | 8/1976 | Kosikowski |
| 4,119,732 A | 10/1978 | Kratochvil |
| 4,172,900 A | 10/1979 | Dooley |
| 4,191,782 A | 3/1980 | Vedamuthu |
| 4,244,971 A | 1/1981 | Wargel et al. |
| 4,425,369 A | 1/1984 | Sakamoto et al. |
| 4,500,549 A | 2/1985 | Crossman |
| 4,584,199 A | 4/1986 | Taylor |
| 4,595,594 A | 6/1986 | Lee et al. |
| 4,670,267 A | 6/1987 | Chang et al. |
| 4,690,826 A | 9/1987 | Haard et al. |
| 4,707,364 A | 11/1987 | Barach et al. |
| 4,708,876 A | 11/1987 | Yokoyama et al. |
| 4,716,045 A | 12/1987 | Prella |
| 4,752,483 A | 6/1988 | Hagberg et al. |
| 5,079,024 A | 1/1992 | Crane |
| 5,108,766 A | 4/1992 | Gelinas et al. |
| 5,180,596 A | 1/1993 | Yokoyama et al. |
| 5,180,604 A | 1/1993 | Crane et al. |
| 5,211,972 A | 5/1993 | Kratky et al. |
| 5,215,778 A | 6/1993 | Davison et al. |
| 5,227,187 A | 7/1993 | Wiser et al. |
| 5,252,352 A | 10/1993 | Banach et al. |
| 5,262,183 A | 11/1993 | Moran et al. |
| 5,271,949 A | 12/1993 | Haring et al. |
| 5,356,640 A | 10/1994 | Jameson et al. |
| 5,455,051 A | 10/1995 | Groesbeck et al. |
| 5,462,755 A | 10/1995 | Mehnert |
| 5,527,505 A | 6/1996 | Yamauchi et al. |
| 5,549,916 A | 8/1996 | Gamay |
| 5,635,228 A | 6/1997 | Sponholtz |
| 5,643,621 A | 7/1997 | Mehnert |
| 5,676,984 A | 10/1997 | Bohanan et al. |
| 5,709,900 A | 1/1998 | Miller et al. |
| 5,753,614 A | 5/1998 | Blackburn et al. |
| 5,895,671 A | 4/1999 | Adamany et al. |
| 5,928,946 A | 7/1999 | De Vos et al. |
| 5,952,022 A | 9/1999 | Veal |
| 6,022,567 A | 2/2000 | Lecouteux et al. |
| 6,036,979 A | 3/2000 | Hormann et al. |
| 6,054,151 A | 4/2000 | Kwon et al. |
| 6,110,509 A | 8/2000 | Nauth et al. |
| 6,183,802 B1 | 2/2001 | Silva et al. |
| 6,214,585 B1 | 4/2001 | Kwon et al. |
| 6,214,586 B1 | 4/2001 | McNeilly |

(Continued)

FOREIGN PATENT DOCUMENTS

| | | |
|---|---|---|
| CA | 972617 A1 | 8/1975 |
| CH | 277288 A | 8/1951 |

(Continued)

OTHER PUBLICATIONS

Ganesan et al, Fatty Acid Production from Amino Acids and a-Keto Acids by Brevibacterium linens BL2, Nov. 2004, Applied and Environmental Microbiology, vol. 70. No. 11.*

(Continued)

*Primary Examiner* — Nikki H Dees
(74) *Attorney, Agent, or Firm* — Fitch, Even, Tabin & Flannery LLP

(57) ABSTRACT

A stabilized, natural biogenerated cheddar flavor component, which may be used to prepare food products having flavor characteristics of traditional style cheeses, and a process for manufacturing the biogenerated cheddar flavor component is provided. The cheese flavor component is stabilized against the growth of spoilage or pathogenic microorganisms therein. The stabilized cheese flavor component is achieved by addition of a bacteriocin source as part of the fermentation process that accelerates at least part of the fermentation time needed for flavor development. Inclusion of secondary microbial barriers are also provided for. Therefore, production times can be significantly reduced for the flavor component of the present invention without loss of flavor and while improving microbial stability. The flavor component can be used in process cheese, process cheese-type products, or other cheeses. The flavor component can also be used as a natural flavoring system in other food products. Methods of making and using the flavor component in food products, such as cheese products, are also provided.

48 Claims, 3 Drawing Sheets

(56) References Cited

U.S. PATENT DOCUMENTS

| | | |
|---|---|---|
| 6,251,445 B1 | 6/2001 | Han et al. |
| 6,322,841 B1 | 11/2001 | Jackson et al. |
| 6,399,121 B1 | 6/2002 | Nielsen |
| 6,406,724 B1 | 6/2002 | Reddy et al. |
| 6,406,736 B1 | 6/2002 | Han |
| 6,416,797 B1 | 7/2002 | Han et al. |
| 6,419,975 B1 | 7/2002 | Han et al. |
| 6,461,841 B2 | 10/2002 | Geueke et al. |
| 6,551,635 B2 | 4/2003 | Nielsen |
| 6,558,716 B1 | 5/2003 | Kent et al. |
| 6,562,383 B1 | 5/2003 | Moran et al. |
| 6,586,025 B2 | 7/2003 | Yvon et al. |
| 6,649,199 B2 | 11/2003 | Bigret |
| 6,649,200 B2 | 11/2003 | Smith et al. |
| 6,689,402 B1 | 2/2004 | Nauth et al. |
| 6,808,735 B2 | 10/2004 | Barbano |
| 6,827,961 B1 | 12/2004 | Bell et al. |
| 6,875,454 B2 | 4/2005 | Nielsen |
| 7,674,489 B2 | 3/2010 | Moran et al. |
| 7,776,370 B2 | 8/2010 | Dias et al. |
| 2001/0024667 A1 | 9/2001 | Smith et al. |
| 2002/0136799 A1 | 9/2002 | Nielsen |
| 2003/0165595 A1 | 9/2003 | Smith |
| 2003/0215544 A1 | 11/2003 | Nielsen |
| 2004/0151803 A1 | 8/2004 | Wolfschoon-Pombo et al. |
| 2004/0258798 A1 | 12/2004 | Rhodes |
| 2005/0069607 A1 | 3/2005 | Nielsen |
| 2005/0112238 A1 | 5/2005 | Dias et al. |
| 2005/0244541 A1 | 11/2005 | Koka et al. |
| 2007/0110848 A1 | 5/2007 | Koka et al. |
| 2007/0172546 A1 | 7/2007 | Moran et al. |
| 2011/0123674 A1 | 5/2011 | Wolfschoon et al. |

FOREIGN PATENT DOCUMENTS

| | | |
|---|---|---|
| DE | 3444282 A1 | 6/1986 |
| DE | 4442162 C1 | 4/1996 |
| EP | 0 006 380 A1 | 1/1980 |
| EP | 0 137 536 A1 | 4/1985 |
| EP | 0 144 274 A1 | 6/1985 |
| EP | 0159303 A3 | 10/1985 |
| EP | 0 180 441 A1 | 5/1986 |
| EP | 0 244 009 A2 | 11/1987 |
| EP | 0 247 646 A1 | 12/1987 |
| EP | 0281167 A1 | 9/1988 |
| EP | 0365173 B1 | 4/1990 |
| EP | 0469857 B1 | 2/1992 |
| EP | 0 478 036 A2 | 4/1992 |
| EP | 0631730 A2 | 1/1995 |
| EP | 0755630 A1 | 1/1997 |
| EP | 0815735 A2 | 1/1998 |
| EP | 0 981 965 A1 | 3/2000 |
| EP | 1 106 071 A2 | 6/2001 |
| EP | 1 186 244 A2 | 3/2002 |
| EP | 1 201 134 A2 | 5/2002 |
| EP | 1 216 619 A2 | 6/2002 |
| EP | 1 356 737 A2 | 10/2003 |
| EP | 1532863 A2 | 5/2005 |
| EP | 1 535 519 A1 | 6/2005 |
| FR | 2 606 255 A1 | 5/1988 |
| GB | 713251 A | 8/1954 |
| GB | 2 170 984 A | 8/1986 |
| JP | 61135541 A | 6/1986 |
| JP | 2001-299211 A | 10/2001 |
| JP | 2004-283056 A | 10/2004 |
| RU | 2 064 270 C1 | 7/1996 |
| WO | 96/08155 A1 | 3/1996 |
| WO | 96/10927 A1 | 4/1996 |
| WO | 96/37114 A1 | 11/1996 |
| WO | 99/51106 A1 | 10/1999 |
| WO | 99/63834 A1 | 12/1999 |
| WO | 00/54601 A1 | 9/2000 |
| WO | 00/72691 A2 | 12/2000 |
| WO | 01/30172 A1 | 5/2001 |
| WO | 01/47366 A1 | 7/2001 |
| WO | 01/80656 A1 | 11/2001 |
| WO | 02/09527 A2 | 2/2002 |
| WO | 02/085131 A1 | 10/2002 |
| WO | 2006012506 A1 | 2/2006 |

OTHER PUBLICATIONS

'UHT Processing', Dairy Science and Technology, University of Guelph, 1998.*

M.E. Aly et al., "Quality of Processed Cheese Spread Made Using Ultrafiltered Retentates Treated With Some Ripening Agents." International Dairy Journal, vol. 5, 1995, pp. 191-209.

H.-D. Belitz et al., "Food Chemistry." Springer, Translation from the Fourth German Edition, 1999, p. 508.

M. Drake et al., "Determination of Regional Differences in Cheddar Cheese Flavor and Texture Development" California Dairy Research Foundation, http://www.cdrf.org/content.asp?contentID=138, 2004, 2 pages.

C. Druaux et al., "Effect of Food Composition and Microstructure on Volatile Flavour Release." Trends in Food Science & Technology, vol. 8, Nov. 1997, pp. 364-368.

P.F. Fox et al., "Chapter 10, Biochemistry of Cheese Ripening." Cheese: Chemistry, Physics and Microbiology, Kluwer Academic/Plenum, 1993, pp. 389-438.

Hui and Khachatourians Ed., Food Biotechnology Microorganisms, 1995, VCH Publishers, Inc., pp. 47-48, 76-78 and 645-646.

Nelson et al., "Reduced Fat Cheese Production by Fat Removal From Aged Cheddar Cheese." American Diary Science Association Annual Meeting, Jul. 24-28, 2000, 13 pages.

A. Oumer et al., "Defined Starter System Including a Bacteriocin Producer for the Enhancement of Cheese Flavour." Biotechnology Techniques, vol. 13, 1999, pp. 267-270.

Fergal P. Rattray et al., "Aspects of Enzymology and Biochemical Properties of Brevibacterium Linens Relevant to Cheese Ripening: A Review." Journal of Dairy Science, vol. 82 1999, pp. 891-909.

V.K. Sood et al., "Process Cheddar Cheese From Plain and Enzyme Treated Retentates." Journal of Dairy Science, vol. 62, 1979, pp. 1713-1718.

A. Tamime et al., "The Quality of Processed Cheese Made From Reconstituted Skim Milk Powder Cheese Base." Egyptian Journal of Dairy Science, vol. 18, 1990, pp. 115-131.

G. Urbach. "Contribution of Lactic Acid Bacteria to Flavour Compound Formation in Dairy Products." International Dairy Journal, vol. 5, 1995, pp. 877-903.

B. Weimer et al., "Influence of NaCl and pH on Intracellular Enzymes That Influence Cheddar Cheese Ripening." Lait, vol. 77, 1997, pp. 383-398.

Bart Weimer et al., "Sulfur Metabolism in Bacteria Associated With Cheese." Antonie van Leeuwenhoek, vol. 76, 1999, pp. 247-261.

European Search Report, European Application No. 07 10 4621, date of the completion of the search Jun. 27, 2007, 2 pages (corresponds to U.S. Appl. No. 11/394,754).

A. G. Williams et al., "Energy Sources of Non-Starter Lactic Acid Bacteria Isolated from Cheddar Cheese," International Dairy Journal, 2000, 10 (1/2) 17-23 (Abstract, 1 page).

M. W. Atiles et al., "Gene Cloning, Sequencing, and Inactivation of the Branched-Chain Aminotransferase of Lactococcus Lactis LM0230," Applied and Environmental Microbiology, 2000, 66 (6) 2325-2329 (Abstract, 1 page).

L. Rijnen et al., "Inactivation of Lactococcal Aromatic Aminotransferase Prevents the Formation of Floral Aroma Compounds from Aromatic Amino Acids in Semi-hard Cheese," International Dairy Journal, 1999, 9 (12) 877-885 (Abstract, 1 page).

B. Dias and B. Weimer, "Conversion of Methionine to Thiols by Lactococci, Lactobacilli, and Brevibacteria," Applied and Environmental Microbiology, 1998, 64 (9) 3320-3326 (Abstract, 1 page).

M. Yvon et al., "An Aminotransferase from *Lactococcus lactis* Initiates Conversion of Amino Acids to Cheese Flavor Compounds," Applied and Environmental Microbiology, 1997, 63 (2) 414-419 (Abstract, 1 page).

(56) References Cited

OTHER PUBLICATIONS

K. H. Ney, "Study of the Flavour of Ziegerklee (*Coerulea mellilotus*) Clover, the Key Flavour Component of Schabzieger (Swiss Herb Cheese)," Gordian, 1986, 86 (1/2) 9-10 (Abstract, 1 page).

J. W. Harper and J. A. Wang, "Amino Acid Catabolism in Cheddar Cheese Slurries. III. Selected Products from Glutamic Acid," Milchwissenschaft, 1981, 36 (2) 70-72 (Abstract, 1 page).

Y. C. Lin et al., "Carbohydrate-Derived Metabolic Compounds in Cheddar Cheese," Milchwissenschaft, 1979, 34 (2) 69-73 (Abstract, 1 page).

K. H. Ney et al., "Investigation of the Flavour Components of Fontina, an Italian Cheese," Fette Seifen Anstrichmittel, 1978, 80 (6) 249-251 (Abstract, 1 page).

K. H. Ney, "Techniques of Flavour Investigation," Gordian, 1973, 73 (10) 380, 382, 384, 387 (Abstract, 1 page).

K. H. Ney and I. P. G. Wirotama, "Unsubstituted Aliphatic Monocarboxylic Acids and Alpha-Keto-Acids in Camembert Cheese," Zeitschrift fuer Lebensmittel-Untersuchung und-Forschung, 1973, 152 (1) 32-34 (Abstract, 1 page).

Y. C. Lin, "Carbohydrate Fermentation in Cheddar Curd Ripening," Dissertation Abstracts International. Section B. The Sciences and Engineering, 1971, 32 (3) 1647 (Abstract, 1 page).

J. W. W Harper and T. Kristofferson, "Biochemistry of Flavour Development in Cheese Slurry Systems," American Chemical Society, 1969, 158 (Abstract, 1 page).

H. Tanako and Y. Obata, "Studies on the Formation of Cheese-like Flavour," Agricultural and Biological Chemistry, 1969, 33 (2) 147-150 (Abstract, 1 page).

J. Banks, "Transaminase Activity in the Enhancement of Cheddar Aroma," Yearbook, 2001, 16 (2 ref.) (Abstract, 1 page).

Various Authors, "Oral Presentations: Amino Acid Catabolism in Cheese," Cheese Ripening and Technology: Abstracts of a Symposium, Banff, Mar. 20-29, 2000, International Dairy Federation (Abstract, 1 page).

"Harnessing Biotechnology," Muir D. Milk Industry International, Sep. 2000, 102 (9), Supplement, 4-5 (Abstract, 1 page).

P. L. H. McSweeney and M J. Sousa, "Biochemical Pathways for the Production of Flavour Compounds in Cheeses During Ripening: A Review," Lait, May-Jun. 2000, 80 (3), 293-324 (Abstract, 1 page).

L. Rijnen et al., "Expression of a Heterologous Glutamate Dehydrogenase Gene in *Lactococcus lactis* Highly Improves the Conversion of Amino Acids to Aroma Compounds," Applied and Environmental Microbiology, Apr. 2000, 66 (4), 1354-1359 (Abstract, 1 page).

L. Rijnen et al., "Inactivation of Lactococcal Aromatic Aminotransferase Prevents the Formation of Floral Aroma Compounds from Aromatic Amino Acids in Cheese," International Dairy Journal, 1999, 9 (12), 877-885 (Abstract, 1 page).

M. Yvon et al., "Adding Alpha-Ketoglutarate to Semi-hard Cheese Curd Highly Enhances the Conversion of Amino Acids to Aroma Compounds," International Dairy Journal, 1998, 8 (10-11), 889-898.

A. Reps et al., "Carbonyl Compounds Produced by the Growth of *Lactobacillus bulgaricus*," Journal of Dairy Science, 1987, 70 (3), 559-562 (Abstract, 1 page).

K. H. Ney, "Flavour of Tilsit Cheese," Fette Seifen Anstrichmittel, 1985, 87 (7), 289-294 (Abstract, 1 page).

B. Dias and B. Weimer, "Purification and Characterization of L-Methionine Gamma-Lyase from Brevibacterium Linens BL2," Applied and Environmental Microbiology, Sep. 1998, 64 (9), 3327-3331 (Abstract, 1 page).

P. L. H. McSweeney et al., "Flavours and Off-Flavours in Milk and Dairy Products," Advanced Dairy Chemistry, 1997, vol. 3: Lactose, Water, Salts and Vitamins, 403-468 (Abstract, 1 page).

W. J. M. Engels et al., "Partial Purification and Characterization of Two Aminotransferases from *Lactococcus lactis* Subsp. Cremoris B78 Involved in the Catabolism of Methionine and Branched-Chain Amino Acids," International Dairy Journal, 2000, 10 (7), 443-452 (Abstract, 1 page).

K. H. Ney and I. P. G. Wirotama, "Flavor of Edelpilzkaese, a German Blue Mold Cheese," Z. Lebensm-Unters Forsch, 1972, 149 (5), 275-279 (Abstract, 2 pages).

K. H. Ney and I. P. G. Wirotama, "Unsubstituted Aliphatic Monocarboxylic Acids, α-Keto Acids, and Amines in Cheddar Cheese Flavor," Z. Lebensm-Unters Forsch, 1971, 146 (6), 337-343 (Abstract, 2 pages).

M. Bourdat-Deschamps et al., "Autolysis of *Lactococcus lactis* AM2 Stimulates the Formation of Certain Aroma Compounds from Amino Acids in a Cheese Model," International Dairy Journal, 2004, 14 (9), 791-800 (Abstract, 1 page).

J. R. Broadbent et al., "Overexpression of *Lactobacillus casei* D-Hydroxyisocaproic Acid Dehydrogenase in Cheddar Cheese," Applied and Environmental Microbiology, 2004, 70 (8), 4814-4820 (Abstract, 1 page).

S. Helinck et al., "Ability of Thermophilic Lactic Acid Bacteria to Produce Aroma Compounds from Amino Acids," Applied and Environmental Microbiology, 2004, 70 (7), 3855-3861 (Abstract, 1 page).

B. Ganesan and B. C. Weimer, "Role of Aminotransferase IlvE in Production of Branched-Chain Fatty Acids by *Lactococcus lactis* Subsp. Lactis.," Applied and Environmental Microbiology, 2004, 70 (1), 638-641 (Abstract, 1 page).

B. Thage et al., "Purification and Characterization of a Branched-Chain Amino Acid Aminotransferase from *Lactobacillus paracasei* Subsp. Paracasei CHCC 2115," Journal of Applied Microbiology, 2004, 96 (3), 593-602 (Abstract, 1 page).

B. Ganesan et al., "Monocarboxylic Acid Production by Lactococci and Lactobacilli," International Dairy Journal, 2004, 14 (3), 237-246 (Abstract, 1 page).

A. Kieronczyk et al., "The Nature of Aroma Compounds Produced in a Cheese Model by Glutamate Dehydrogenase Positive Lactobacillus INF15D Depends on its Relative Aminotransferase Activities Towards the Different Amino Acids," International Dairy Journal, 2004, 14 (3), 227-235 (Abstract, 1 page).

B. A. Smit et al., "Chemical Conversion of ALPHA-keto Acids in Relation to Flavor Formation in Fermented Foods," Journal of Agricultural and Food Chemistry, 2004, 52 (5), 1263-1268 (Abstract, 1 page).

M. G. Casey et al., "Effect of Alpha-keto Acids on the Development of Flavour in Swiss Gruyere-type Cheese," Lebensmittel-Wissenschaft und -Technologie, 2004, 37 (2), 269-273 (Abstract, 1 page).

A. G. Williams et al., "Enzymes Involved in Flavour Formation by Bacteria Isolated from the Smear Population of Surface-Ripened Cheese," International Journal of Dairy Technology, 2004, 57 (1), 7-13 (Abstract, 1 page).

L. Rijnen et al., "*Lactococcal aminotransferases* AraT and BcaT are Key Enzymes for the Formation of Aroma Compounds from Amino Acids in Cheese," International Dairy Journal, 2003, 13 (10), 805-812 (Abstract, 1 page).

C. Martinez-Cuesta et al., "Lacticin 3147 Favours Isoleucine Transamination by *Lactococcus lactis* IFPL359 in a Cheese-Model System," Biotechnology Letters, 2003, 25 (8), 599-602 (Abstract, 1 page).

M. T. Froehlich-Wyder et al., "Keto Acids and Cheese Aroma," AgrarForschung, 2003, 10 (1), 40-42 (Abstract, 1 page).

A. Kieronczyk et al., "Cooperation Between *Lactococcus lactis* and Nonstarter Lactobacilli in the Formation of Cheese Aroma from Amino Acids," Applied and Environmental Microbiology, 2003, 69 (2), 734-739 (Abstract, 1 page).

F. Tavaria et al., "Amino Acid Catabolism and Generation of Volatiles by Lactic Acid Bacteria," Journal of Dairy Science, 2002, 85 (10), 2462-2470 (Abstract, 1 page).

A. G. Williams et al., "Factors Affecting the Activity of Enzymes Involved in Peptide and Amino Acid Catabolism in Non-Starter Lactic Acid Bacteria Isolated from Cheddar Cheese," International Dairy Journal, 2002, 12 (10), 841-852, (Abstract, 1 page).

A. Thierry et al., "Conversion of L-leucine to isovaleric acid by Propionibacterium freudenreichii TL 34 and ITGP23," Applied and Environmental Microbiology, 2002, 68 (2), 608-615 (Abstract, 1 page).

(56) References Cited

OTHER PUBLICATIONS

F. Amarita et al., "Formation of Methional by Lactococcus Lactis IFPL730 Under Cheese Model Conditions," European Food Research and Technology, 2002, 214 (1), 58-62 (Abstract, 1 page).

A. Thierry and M. B. Maillard, "Production of Cheese Flavour Compounds Derived from Amino Acid Catabolism by Propionibacterium Freudenreichii," Lait, 2002, 82 (1), 17-32 (Abstract, 1 page).

S. Ur-Rehman and P. F. Fox, "Effect of Added Alpha-Ketoglutaric Acid, Pyruvic Acid or Pyridoxal Phosphate on Proteolysis and Quality of Cheddar Cheese," Food Chemistry, 2002, 76 (1), 21-26 (Abstract, 1 page).

H. E. Spinnler et al., "Production of Sulfur Compounds by Several Yeasts of Technological Interest for Cheese Ripening," International Dairy Journal, 2001, 11 (4-7), 245-252 (Abstract, 1 page).

J. M. Banks et al., "Enhancement of Amino Acid Catabolism in Cheddar Cheese Using Alpha-Ketoglutarate: Amino Acid Degradation in Relation to Volatile Compounds and Aroma Character", International Dairy Journal, 2001, 11 (4-7), 235-243.

B. V. Hansen et al., "Transamination of Branched-Chain Amino Acids by a Cheese Related *Lactobacillus paracasei* Strain," International Dairy Journal, 2001, 11 (4-7), 225-233 (Abstract, 1 page).

A. Kieronczyk et al., "Metabolism of Amino Acids by Resting Cells of Non-Starter Lactobacilli in Relation to Flavour Development in Cheese," International Dairy Journal, 2001, 11 (4-7), 217-224 (Abstract, 1 page).

M. Yvon and L. Rijnen, "Cheese Flavour Formation by Amino Acid Catabolism," International Dairy Journal, 2001, 11 (4-7), 185-201.

N. Klein et al, "Conversion of Amino Acids into Aroma Compounds by Cell-Free Extracts of *Lactobacillus helveticus*," Journal of Applied Microbiology, 2001, 91 (3), 404-411 (Abstract, 1 page).

M. Ummadi and B. C. Weimer, "Tryptophan Catabolism in Brevibacterium Linens as a Potential Cheese Flavor Adjunct," Journal of Dairy Science, 2001, 84 (8), 1773-1782 (Abstract, 1 page).

A. C. Curtin et al., "Amino Acid Catabolism in Cheese-Related Bacteria: Selection and Study of the Effects of pH, Temperature and NaCl by Quadratic Response Surface Methodology," Journal of Applied Microbiology, 2001, 91 (2), 312-321 (Abstract, 1 page).

A. C. Curtin and P. L. H. McSweeney, "Catabolism of Amino Acids in Cheese During Ripening," Cheese: Chemistry, Physics and Microbiology, vol. 1: General Aspects, 3rd Edition, 2004, 435-454, Elsevier, Amsterdam (Abstract, 1 page).

J. M. Banks and A. G. Williams, "The Role of the Nonstarter Lactic Acid Bacteria in Cheddar Cheese Ripening," International Journal of Dairy Technology, May-Aug. 2004, 57 (2-3), 145-152 (Abstract, 1 page).

A. G. Williams et al., "The Effect of Alpha-Ketoglutaric Acid on Amino Acid Utilization by Nonstarter *Lactobacillus* spp. Isolated from Cheddar Cheese," Letters in Applied Microbiology, 2004, 38 (4), 289-295 (Abstract, 1 page).

B. Ganesan et al., "Monocarboxylic Acid Production by Lactococci and Lactobacilli," International Dairy Journal, Mar. 2004, 14 (3), 237-246 (Abstract, 1 page).

W. J. M. Engels et al., "Flavour Formation in Cheese," Dairy Processing: Improving Quality, 2003, 492-511, Woodhead Publishing Ltd., Cambridge (Abstract, 1 page).

J. M. Banks and A. G. Williams, "Uninvited Friends: Non-Starter Lactic Acid Bacteria in Cheese Ripening," Yearbook, 2003, 22-28, Hannah Research Institute, Ayr, United Kingdom (Abstract, 1 page).

M. M. Churchill et al., "Proteolysis at the Surface of Tilsit Cheese," Milchwissenschaft, 2003, 58 (5-6), 293-296 (Abstract, 1 page).

M. Yvon, "Changing Cheese," Dairy Industries International, Dec. 2002, 67 (12), 25 (Abstract, 1 page).

M. De Angelis et al., "*Lactobacillus reuteri* DSM 20016: Purification and Characterization of a Cystathionine Gamma-Lyase and Use as Adjunct Starter in Cheesemaking," Journal of Dairy Research, May 2002, 69 (2), 255-267 (Abstract, 1 page).

A. C. Curtin et al., "Amino Acid Catabolism in Cheese-Related Bacteria: Selection and Study of the Effects of pH, Temperature and Salt by Quadratic Response Surface Methodology", Journal of Applied Microbiology, Aug. 2001, 91 (2), 312-321 (Abstract, 1 page).

A. G. Williams et al., "Catabolism of Amino Acids by Lactic Acid Bacteria Isolated from Cheddar Cheese," International Dairy Journal, 2001, 11 (4-7), 203-215 (Abstract, 1 page).

J. Banks, "Transaminase Activity in the Enhancement of Cheddar Aroma," Yearbook, 2001, 16, Hanna Research Institute, Ayr, United Kingdom (Abstract, 1 page).

P. Fernandez De Palencia et al., "Enhancement of 2-Methylbutanal Formation in Cheese by Using a Fluorescently Tagged Lacticin 3147 Producing *Lactococcus lactis* Strain," International Journal of Food Microbiology, Jun. 15, 2004, 93 (3), 335-347 (Abstract, 2 pages).

C. Tanous et al., "Glutamate Dehydrogenase Activity: A Major Criterion for the Selection of Flavour-Producing Lactic Acid Bacteria Strains," Antonie van Leeuwenhoek, Aug. 2002, 82 (1-2), 271-278 (Abstract, 1 page).

F. Amarita et al., "*Lactobacillus casei* and *Lactobacillus plantarum* Initiate Catabolism of Methionine by Transamination," Journal of Applied Microbiology, Jun. 2001, 90 (6), 971-978 (Abstract, 1 page).

S. Gummalla, "Aromatic Amino Acid Catabolism by *Lactobacillus* Spp.: Biochemistry and Contribution to Cheese Flavor Development," Utah State University, Department of Nutrition and Food Sciences, 2002 (Dissertation Abstract, 1 page).

Japanese Official Notice of Rejection, Japanese Patent Application No. 2007-082337, mailed Mar. 19, 2012, 8 pages.

Upadhya, R., et al. "D-Amino Acid Oxidase and Catalase of Detergent Permeabilized Rhodotorula Gracilis Cells and Its Potential Use for the Synthesis of Alpha-keto Acids." Process Biochemistry, vol. 35 (1999), pp. 7-13.

A.W. Maurice Sweetsur et al., "Effect of Concentration by Ultrafiltration on the Heat Stability of Skim-Milk." Journal of Dairy Research, 1980, vol. 47, pp. 327-335.

\* cited by examiner

Process for Cheese Powder

METHODS FOR RAPID PRODUCTION AND USAGE OF BIOGENERATED FLAVORS

FIELD OF THE INVENTION

The present invention generally relates to a stabilized, natural biogenerated cheddar flavor component, which may be used to prepare food products having flavor characteristics of traditional style cheeses. More specifically, the present invention relates to the accelerated development of a cheese flavor component, which is stabilized against the growth of spoilage or pathogenic microorganisms therein. The stabilized cheese flavor component is achieved by addition of a bacteriocin source combined with additional microbial barriers as part of the fermentation process that accelerates at least part of the fermentation time needed for flavor development. Therefore, production times can be significantly reduced for the flavor component of the present invention without loss of flavor and while improving microbial stability. The flavor component can be used in process cheese, process cheese-type products, or other cheeses. The flavor component can also be used as a natural flavoring system in other food products. Methods of making and using the flavor component in food products, such as cheese products, are also provided.

BACKGROUND OF THE INVENTION

Traditionally, natural cheese is made by developing acidity in milk and setting the milk with a clotting agent, such as rennet, or by developing acidity to the isoelectric point of the casein. The set milk is cut and whey is separated from the curd. The curd may be pressed to provide a cheese block. Curing typically takes place over a lengthy period of time under controlled conditions. Cheddar cheese, for example, is often cured for a number of months, and may be cured for a period in excess of one year, to obtain the full flavor desired.

Numerous reports have been published implicating several compounds to be important in the development of cheese flavor in cheese products. The main classes of compounds thought to contribute to flavor generation in cheese include amino acids, peptides, carbonyl compounds, fatty acids and sulfur compounds. Urbach, G., Contribution of Lactic Acid Bacteria to Flavor Compound Formation in Dairy Products, Int'l Dairy J., 3: 389-422 (1995). Several volatile compounds including fatty acids, esters, aldehydes, alcohols, ketones and sulfur compounds are included in lists describing the aroma of various cheeses. Production of several of these aroma and flavor compounds has been attributed to multiple enzymatic and chemical reactions that take place in a sequential manner in ripening cheese.

Cheese manufacturers are interested in developing cheese products requiring less storage time before they are favorable enough for commercial distribution. Cheese makers have used a wide variety of different techniques in efforts to accelerate the cheese curing or ripening process. U.S. Pat. No. 6,649,200 provides a summary of a number of these techniques used for accelerating ripening of hard block cheeses, and reference is made thereto.

Various microorganisms have been identified and selected for their ability to produce particular flavors in a cheese ripening environment. These flavors arise through a series of enzymatic steps. For example, in cheese, degradation of proteins by proteases and peptidases can lead to the production of peptides and free amino acids. These precursors are shuttled through subsequent enzymatic and chemical reactions resulting in the formation of flavor compounds. An understanding of these reactions helps in the creation of flavors of a desired cheese type. Fox, P., Cheese: Chemistry, Physics and Microbiology, pp. 389-483,1993.

However, even if these prior processes may produce an accelerated development, or an enhancement, of cheese flavor, they do not produce enhancements that target specific cheese flavor components. More recently a technology has been developed to produce a natural biogenerated cheese flavoring system that can be used to prepare different cheese products/derivatives, targeted at various cheese flavor profiles using a modular approach to flavor creation, which is described in U.S. Pat. No. 6,406,724 and U.S. Publication No. 20050112238.

U.S. Pat. No. 6,406,724 is directed to a natural biogenerated cheese flavoring system containing a sulfury-cheddar flavor component, a creamy-buttery flavor component, and a cheesy flavored component. The sulfury-cheddar flavor component is prepared in a two stage fermentation process.

U.S. Publication No. 20050112238 is directed to a stabilized cheese flavoring system obtained by addition of a bacteriocin source as part of the fermentation. The sulfury-cheddar flavor component of the flavoring system is also produced in a two stage fermentation process.

The cheese flavoring system described in the '724 patent and the '238 publication are made up of different components, in which the individual components are combined in different ratios to provide specific flavor profiles in the cultured cheese concentrate products.

In addition, the effects of bacteriocin producers, when used as adjunct cultures to thermophilic starters of high aminopeptidase activity, on ripening speed in semi-hard and hard cheeses has been observed and described in the literature. Oumer, A., et al., "The Effects of Cultivating Lactic Starter Cultures with Bacteriocin-Producing Lactic Acid Bacteria," J. Food Protection, vol. 64, no. 1, pp. 81-86. The use of a bacteriocin-producing E. faecalis culture in a cheese starter system for making a semi-hard cheese at low pH's (below pH 5.5) for enhancement of cheese flavor after a relatively long ripening period (viz., 21 to 35 days), has been described by Oumer, A., et al., "Defined Starter System Including a Bacteriocin Producer for the Enhancement of Cheese Flavor," Biotechn. Techniques, 13: 267-70 (1999). The use of live cultures having high levels of proteolytic enzymes and peptidolytic enzymes to debitter enzyme-modified cheeses (EMC's) also has been described, such as in U.S. Pat. No. 6,214,585.

However, in addition to accelerating ripening or flavor development in cheeses, another important consideration in modern cheese-making is the inhibition of the growth of spoilage and pathogenic microorganisms in the cheese products. For instance, processed block cheese and processed cheese spreads can be vulnerable to spoilage by germination and growth of bacterial spores that originate in the raw cheese and survive the cooking (melt) process used in their manufacture.

Bacteriocins are generally known as being effective in inhibiting the growth of pathogenic and spoilage microorganisms in foods, such as described by Twomey, D. et al., Lantabiotics Produced by Lactic Acid Bacteria: Structure, Function and Applications, Antonie van Leeuwenhoek, 82:15-185 (2002), and Cleveland, J., et al., "Bacteriocins: Safe, Natural Antimicrobials for Food Preservation," Int'l J. Food Micro., 71:1-20 (2001). Antimicrobials, such as nisin, lacticin, plantaricin C, and so forth, are generally understood to act on sensitive cells by forming pores in the cytoplasmic membrane. This leads to the dissipation of the proton motive force and release of small intracellular molecules like glutamate and ATP, such as described by Twomey et al. and Cleveland et al., referenced above. This renders the cells permeable but still capable of participating in biochemical processes in its environment. The treatment of cells with surface-active agents to help generate such 'leaky' cells has been described in PCT Int'l Publication No. WO 01/47366 A1.

Nisin, in particular, is a peptide-like antibacterial substance produced by certain strains of the dairy starter organism *Lactococcus lactis* subsp. *lactis* (formerly known as *Streptococcus lactis*). Nisin is a small polypeptide of 34 amino acids, which include the atypical residues lanthionine, β-methyllanthionine, dehydroalanine, and dehydrobutyrine. The first two mentioned residues close the single sulfur rings that are characteristic of nisin and other structurally related bacteriocins. Variants of nisin are known, including, for example, Nisin A and Nisin Z. Nisin's structure is illustrated, for example, in U.S. Pat. No. 5,527,505 to Yamauchi et al. The highest activity preparations of nisin contain about 40 million IU per gram. A commercial preparation, NISAPLIN®, containing about 1 million IU active nisin per gram is available from Aplin & Barrett Ltd., Trowbridge, England. Nisin has no known toxic effects in humans. It is widely used in a variety of prepared foods. Experimental use in preserving other foods has also been reported. The cultures that produce nisin, being lactic fermentations, generally produce lactate as well.

The possibility that nisin may inhibit Gram-positive and Gram-negative bacteria when used in conjunction with a chelating agent has been described in U.S. Pat. No. 5,753,614. With respect to cheese products in particular, nisin has been used to inhibit growth and toxin formation of spore-forming spoilage organisms in process cheeses, such as described in U.K. Patent 713,251, and in process cheese spreads, such as described in U.S. Pat. No. 4,584,199. The use of a nisin-producing culture to stabilize a cream cheese composition against the growth of microbiological contaminants therein also has been described in U.S. Pat. No. 6,110,509. In the '509 patent, the cream cheese is made using a fermentation step conducted until a composition inoculated with a nisin-producing microorganism attains a pH in the range of 4.0 to 6.2, more particularly about 5.5, at which point curds and nisin-containing whey are separated.

It has also been described in U.S. Publication 20050112238 that nisin can be used to accelerate fermentation time using a *Brevibacterium linens* culture for producing sulfury-cheddar flavor components.

Despite the developments described in the above patents and publications, a need still exists for a cheese flavor component that can develop its flavor rapidly, while inhibiting the growth of objectionable and pathogenic microorganisms in the resulting product. The present invention provides a cheese flavor component and method for its manufacture that meets these and other desirable needs as well as provides other benefits.

SUMMARY OF THE INVENTION

The present invention relates generally to a stabilized, natural biogenerated flavor component which can be used to prepare flavored cheeses in which the flavor component is stabilized against the growth of spoilage or pathogenic microorganisms therein, while flavor development is accelerated. The flavor component is obtained by addition of a bacteriocin source combined with additional microbial barriers as part of the fermentation process that accelerates the fermentation time needed for flavor development. Therefore, production times can be significantly reduced without loss of flavor and while improving microbial stability.

More specifically, the present invention relates to a cheddar cheese flavor component. The cheddar flavor component can also be used alone to replace aged flavored cheese in the manufacture of process cheese. Thus, the present invention also provides a process for producing a sharp cheddar flavor component or concentrate for use in cheese manufacture. This sharp cheddar flavor component or concentrate can be used alone to add specific flavor notes to natural cheese, especially to provide sharp cheddar notes to very young cheddar cheeses. The cheddar flavor component can be added to process cheese or other cheeses with desired flavor profiles. The cheddar flavor component can be added to the milk substrate used to produce a cheese, wherein the milk substrate is then treated to produce the desired cheese.

The cheddar flavor component can also be used as a flavor building block with other flavor components, such as those described in U.S. Pat. No. 6,406,724 and U.S. Publication No. 20050112238, incorporated by reference herein, to provide cheese products with the desired flavor profile.

In one embodiment, the present invention provides a cheddar flavor component, wherein the cheddar flavor component is prepared by:
  preparing a first mixture comprising about 1 to about 8 percent protein, about 25 to about 70 percent fat, about 0.01 to about 2 percent sulfur-containing substrate, about 2 to about 15 percent salt, and a bacteriocin source, wherein the first mixture has a pH of about 5 to about 9;
  heating the first mixture at a temperature and time effective for sterilizing the first mixture;
  cooling the heated first mixture to about 20 to about 30° C.;
  treating the cooled first mixture with a bacteriocin-resistant culture to form a second mixture, whereby the bacteriocin-resistant culture is effective for converting the sulfur-containing substrate to sulfur-containing flavor compounds; and
  treating the second mixture at a temperature sufficient to inactivate the culture in the second mixture to form the flavor component.

Percentages should be understood as percentages by weight unless stated otherwise.

The flavor component can be used directly or the flavor component can be further treated to remove water (e.g., by spray drying, freeze drying, centrifugation, ultra filtration, nanofiltration, reverse osmosis, or the like) to form a powder or a paste. The flavor component can be incorporated into food products to impart or intensify flavor in the products. For instance, the flavor component of the present invention can be added as a cheddar flavor component to or upon various foods such as cheeses, dairy bases, snacks, pastas, vegetables, doughs, breads, masa, and so forth, to impart a cheese flavor thereto. The cheese or dairy base can be selected, for example, from process cheese, natural cheese, cream cheese, or cottage cheese.

The flavor component of the present invention also can be used as a cultured cheese concentrate incorporated into a milk substrate or whey substrate from which cheese is produced. For instance, the cultured cheese concentrates can be added to a milk substrate used to produce cheese, wherein the milk substrate is then treated to produce the desired cheese. Alternatively, the cheddar flavor component can be added to a cheese or dairy base (i.e., a cheese curd and/or dairy solids lacking the desired cheddar flavor) to produce the desired cheese. The cheddar flavor component can also be used as a natural flavoring system in other food products. The cheddar flavor component can also be used in the methods described in U.S. Pat. No. 6,562,383, which is hereby incorporated herein by reference in its entirety, to provide a flavored cheese that does not require curing or aging.

For purposes of the present invention, bacteriocins or bacteriocin sources generally include antimicrobial agents suitable for use in food products. Especially preferred antimicrobial agents include "lantibiotics" (i.e., polypeptides containing lanthionine and β-methyl lanthionine). Non-limiting examples of such lantibiotics are nisin, such as nisin A or nisin Z, or nisin analogs or related lanthionine-containing peptides, such as pediocin, lactosin, lactacins (e.g., lacticin A, lacticin B, lactacin F), camocin, enterocin, plantaricin, subtilin, epidermin, cinnamycin, duramycin, ancovenin, Pep 5, and the like, individually or in any combination thereof. Other bacteriocins that are useful in the present invention include, for example, lactococcins (e.g., lactococcin A, lactococcin B, lactococcin M), leucocoin, helvetican, acidophilucin, caseicin, and the like, individually or in any combination.

DETAILED DESCRIPTION

Figure 1:
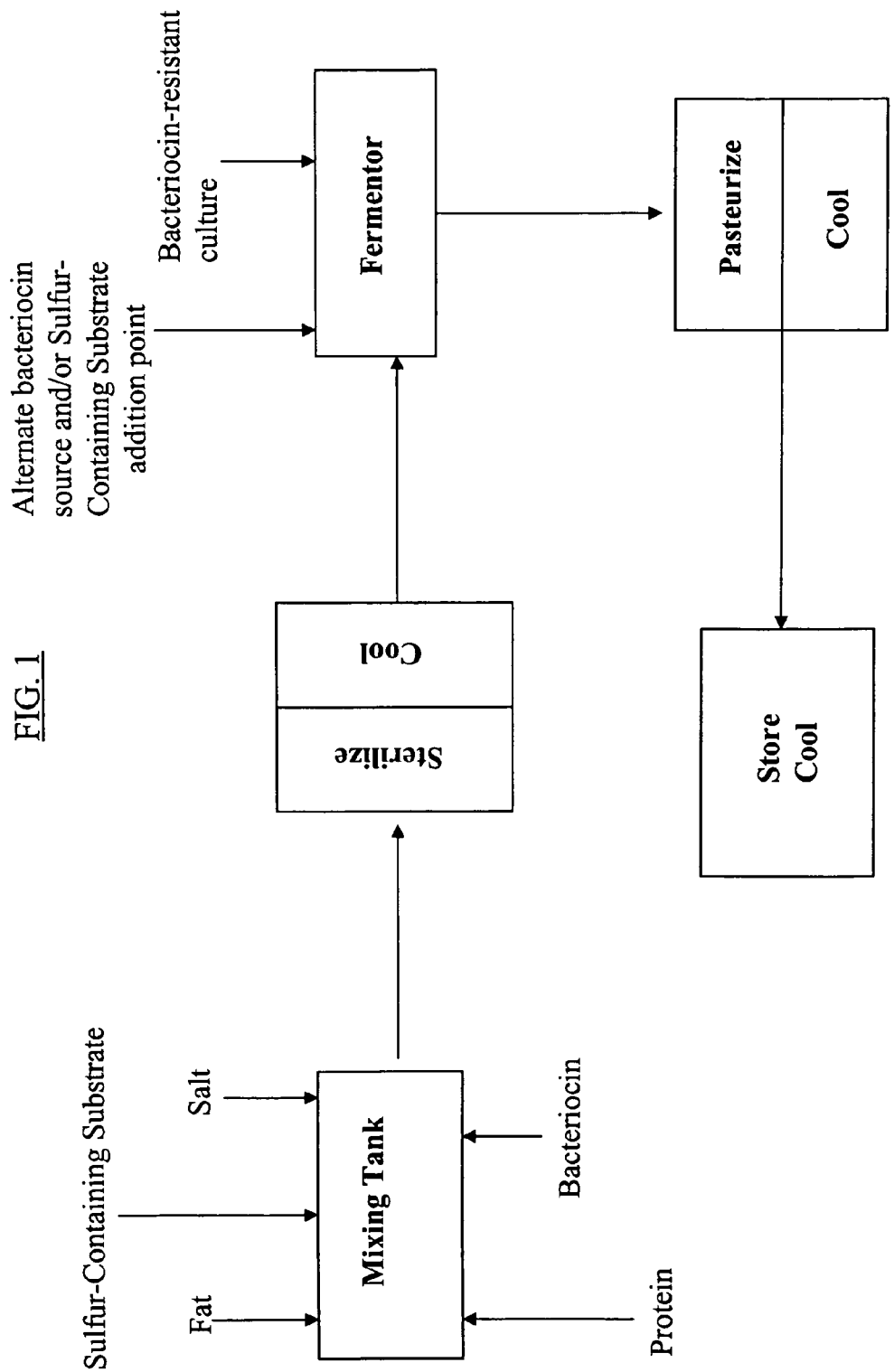
FIG. 1 illustrates the preparation of a cheddar flavor component of the present invention.

The present invention relates to a stabilized, natural biogenerated flavor component which can be used to prepare cheeses having desired flavor profiles. The flavor component is stabilized against the growth of spoilage or pathogenic microorganisms therein, while accelerated development of flavor is achieved.

Growth of spoilage or pathogenic microorganisms is prevented by a variety of means. The first heat treatment step is carried out under conditions commonly employed in sterilization or ultra high temperature (UHT) treatment to reduce initial spore loads.

High levels of salt (about 2 to about 15 weight percent, preferably about 6 to about 10 weight percent) are introduced prior to the first heat treatment step to reduce outgrowth of spores.

Antimicrobial agents are introduced prior to, after, or both before and after the first heat treatment step. The antimicrobial agents have cell-permeabilizing capability to accelerate and aid generation of flavor and aroma compounds, especially under higher pH reaction conditions, for the production of the cheddar flavor component. The use of the antimicrobial cell-permeabilizing agents in this manner has the concurrent advantage of inhibiting the growth of undesirable food spoilage and pathogenic bacteria both during and after production of the flavor component. Antimicrobial agents are interchangeably referred to herein as bacteriocins.

The term bacteriocin encompasses either bacteriostatic and/or bactericidal activity against vegetative cells, and/or sporocidal and/or sporostatic activity against bacterial spores. Bacteriocins and lactobiotics, such as nisin, are thought to increase the permeability of the cytoplasmic membrane or cell wall of components present or developed in a second mixture during fermentation, permitting a substrate to diffuse across the cell membrane and be degraded to generate flavor compounds. Since the enzymes within the cell are still active, and in a relatively favorable environment, the enzymes are capable of degrading various substrate molecules to generate flavor compounds.

The optimum conditions for many of the enzymatic reactions involved in the generation of various cheese flavor compounds are approximately at or above a pH of about 6. The closer the pH of the second mixture to neutral, the more favorable these conversions generally will be. However, pH's above about 5.8 in cheese flavor components or precursors thereof generally also are more conducive to the growth of various food spoilage and pathogenic microorganisms. In the present invention, the use of bacteriocins and salt, as well as a sterilizing heat treatment step prior to fermentation, allows fermentation to occur at a pH of about 6 to about 7 without outgrowth of food spoilage and pathogenic microorganisms. Fermentation at a pH of about 6 to about 7 allows acceleration of flavor development.

In the present invention, the second mixture is fermented during one fermentation stage with a bacteriocin source present at a pH or pH's ranging generally from about 5 to about 9, and preferably from about 5.0 to about 8, and more preferably between about 5.8 to about 7. The lantibiotic nisin, for example, is sufficiently soluble to provide active levels thereof in the reaction mixtures encountered in methods practiced according to the present invention throughout the pH range of about 5 to about 9.

In the present invention, a secondary antimicrobial agent can also be used in combination with the bacteriocin source in preparing the cheddar flavor component. Such secondary antimicrobial agents should not adversely affect the preparation of the cheddar flavor component. Examples of such secondary antimicrobial agents include, for example, metal chelating agents (e.g., EDTA, citric acid, and the like), proton ionophores (e.g., sorbic acid, benzoic acid, parabens, and the like), lacto-antimicrobials (e.g., lactoferrin, lactolipids, and the like), ovo-antimicrobials (e.g., lysozyme, ovotransferrin, and the like), monoglycerides (e.g., monolnolenin, monolaurin, and the like), hops acids, and the like. When used, these secondary antimicrobial agents are generally present at levels of about 0.01 to about 0.5 percent. Especially preferred combinations include (1) nisin and EDTA, (2) nisin and mololinolenin, and (3) nisin and hop acids. Salt may also act as a secondary antimicrobial agent. In this aspect, salt may be utilized at a level of about 2 to about 15 weight percent, preferably about 6 to about 10 weight percent. An especially preferred salt is NaCl.

The preparation of the cheddar component is preferably carried out in a one-stage process as illustrated in FIG. 1. In the present methods, the starting material is a first mixture comprising about 1 to about 8 percent protein, about 25 to about 70 percent fat, about 0.01 to about 2 percent sulfur-containing substrate, about 2 to about 15 percent salt, and about 0.01 percent to about 0.1 percent bacteriocin source. The first mixture has a pH of about 5 to about 9, preferably about 5.0 to about 8, and more preferably about 5.8 to about 7.

A useful fat and protein source for the starting material can be a dairy product, preferably sweet cream. The protein source can be a dried protein or concentrated material and is preferably a dairy ingredient, such as milk protein concentrate, fractionated milk protein, concentrated milk fat, whey protein concentrate, dried whey, non-fat dry milk, milk protein isolate, whey protein isolate, or mixtures thereof. Other protein sources, such as soy protein, corn protein, wheat protein, and/or rice protein can be used in part or as the sole protein source. The fat source is preferably a milk fat such as anhydrous milk fat, butter, cream, or mixtures thereof. Other non-dairy fat sources, such as vegetable or canola oil, can be used in part or as the sole fat source.

As apparent from comparing the results shown below in Table 1, a first mixture having a higher fat content is superior in flavor to a first mixture having a lower fat content. For example, desirable sulfur flavor compounds, such as methanethiol, methylthiol acetate, dimethyldisulfide, and dimethyltrisulfide, are present at higher levels when a first mixture with a higher fat content is used. While not wishing to be limited by theory, increasing the fat content of the first mixture appears to enhance flavor retention.

TABLE 1

| Fat Content of First Mixture | MeSH (ppm) | MeSAc (ppm) | DMDS (ppm) | DMTS (ppm) |
|---|---|---|---|---|
| 18 percent dairy fat | 19 | ND | 0.86 | 0.4 |
| 36 percent dairy fat | 80 | 0.02 | 1.34 | 1.4 |

MeSH = Methanetbiol
MeSAc = Methylthiol acetate
DMDS = Dimethyldisulfide
DMTS = Dimethyltrisulfide The bacteriocin source and/or the sulfur-containing substrate may be added to the first mixture before the heat treatment step, after the heat treatment step, or both before and after the heat treatment step. The flavor of the cheddar flavor component obtained when the bacteriocin source and sulfur-containing substrate were added prior to the heat treatment step was similar to that obtained when the bacteriocin source and sulfur-containing substrate were added after the heat treatment step.

If the bacteriocin source and the sulfur-containing substrate are added after the heat treatment step, the bacteriocin source and the sulfur-containing substrate are sterilized prior to addition to the mixture. The bacteriocin source and the sulfur-containing substrate may be sterilized by filter sterilization, or any other means effective for sterilizing the bacteriocin source and the sulfur-containing substrate without diminishing the activity of the bacteriocin source and the sulfur-containing substrate.

The bacteriocin source used in the preparation of the cheddar flavor component can be a bacteriocin compound per se, or a bacteriocin-producing culture under the relevant fermentation conditions such as described herein. Non-limiting examples of such bacteriocins are nisin, such as the nisin variants nisin A and/or nisin Z, or nisin analogs or related lanthionine-containing peptides, such as pediocin, plantaricin, subtilin, epidermin, cinnamycin, duramycin, ancovenin, and Pep 5, individually or in any combination thereof. The bacteriocin source can be a commercial source such as NISAPLIN®, containing about 1 million IU active nisin per gram, which is available from Aplin & Barrett Ltd., Trowbridge, England. Nisin-producing cultures also can be used including applicable strains of lactic acid bacteria. Nisin can be isolated from natural sources or produced by recombinant DNA technology. Nisin has a molecular weight of approximately 3500, but may also exist as dimers or tetramers having molecular weights of approximately 7,000 and 14,000, respectively.

The resulting first mixture can be used as the starting material that is subjected to heat treatment and fermentation to prepare the flavoring component of the present invention. About 2 to about 15 percent salt, preferably about 6 to about 10 percent, is added to the first mixture prior to fermentation with the cultures to produce the specific flavoring components.

The first mixture is heat treated to sterilize the mixture. As used herein, "sterilizing" means at least a 10 log reduction of spores present in the first mixture as compared to commercially available starting materials which have not been treated to reduce spores. Table 2 below details the times and temperatures that may be used in the heat treatment to achieve a 10 log reduction of spores in the first mixture. The heat treatment can be carried out under conditions commonly employed in sterilization or ultra high temperature (UHT) treatment. That is, the temperature is preferably about 105 to 120° C. If the heat treatment is an UHT treatment, the temperature is more preferably about 135 to 140° C. (in case of indirect heating, e.g., with a plate heat exchanger) or about 140 to about 150° C. (in case of direct heating, e.g., by steam injection). If the heat treatment is a sterilization treatment, a preferred temperature is in the range of about 110 to about 120° C. The heat treatment is preferably carried out for about 2 seconds to about 20 minutes. More preferably, in case of UHT treatment, the heating time is from about 2 to about 15 seconds, whereas it is in the range of from about 10 to about 20 minutes for the sterilization treatment. In general, the heat treatment can be carried out by means of direct steam injection or by using a scraped surface heat exchanger or any type of batch cooker (e.g., Stephan cooker) as conventionally used in the art.

TABLE 2

| Time (sec) | Time (hours) | Time (min) | Temp ° F. | Temp ° C. | Log Reduction |
|---|---|---|---|---|---|
| 0.504 | | 0.0084 | 280 | 137.78 | 10.07 |
| 0.954 | | 0.0159 | 275 | 135.00 | 10.06 |
| 1.8 | | 0.03 | 270 | 132.22 | 10.01 |
| 3.42 | | 0.057 | 265 | 129.44 | 10.03 |
| 6.48 | | 0.108 | 260 | 126.67 | 10.03 |
| 12.3 | | 0.205 | 255 | 123.89 | 10.04 |
| 23.4 | | 0.39 | 250 | 121.11 | 10.07 |
| 44.4 | | 0.74 | 245 | 118.33 | 10.08 |
| 90 | 0.03 | 1.5 | 240 | 115.56 | 10.78 |
| 159 | 0.04 | 2.65 | 235 | 112.78 | 10.05 |
| 300 | 0.08 | 5 | 230 | 110.00 | 10.00 |
| | 0.16 | 9.5 | 225 | 107.22 | 10.02 |
| | 0.30 | 18 | 220 | 104.44 | 10.02 |
| | 0.58 | 34.5 | 215 | 101.67 | 10.13 |
| | 1.08 | 65 | 210 | 98.89 | 10.07 |
| | 2.05 | 123 | 205 | 96.11 | 10.05 |

The heat-treated mixture is subsequently cooled to a temperature below about 100° C. and above about 15° C. (e.g., about 15 to about 98° C.), preferably about 20 to about 40° C., more preferably 20 to 30° C., and most preferably about 25 to about 28° C. The cooling may be carried out by flash cooling or by using any type of heat exchanger or other cooling device such as a plate heat exchanger, scraped surface heat exchanger, and the like, or any combination thereof.

Optionally, lipase may be added to the first mixture after the heat treatment and cooling steps and prior to fermentation. Lipase (sometimes referred to as an esterase) is an enzyme that is well known in the art. Lipases are typically derived from the gullet tissues of young animals (calves, kids, or lambs), from the pancreas of adult animals, or from microbial sources. Various commercial preparations derived from gullet tissue are available from Degussa, Rhodia, or other such companies under various trade names. The enzyme can be manufactured by grinding edible gullet with salt and non-fat dry milk, drying the mixture, and grinding again. Microbial sources of lipase are, for example, the molds *Candida cylindracea* Type VII, *Aspergilus oryzae, A. niger, Pencillium roqueforti, P. glaucum, Rhizopus oryzae, Mucor meihei, Bacillus* species, and *Chromobacter* species. A powdered lipase (preferably a fungal lipase) is generally used. A suitable fungal lipase is commercially available from Biocatalysts under the tradename LIPOMOD™ 187. The preferred lipase is a blend of animal derived esterases with a concentration of 26 esterase units per gram and is added at 0.13 to 1.04 esterase units per gram of fermentation mixture.

The cooled first mixture is fermented during a single stage fermentation procedure. A bacteriocin source and/or a sulfur-containing substrate may optionally be added to the culture vessel prior to fermentation. A bacteriocin-resistant culture is added to the fermentation vessel to begin the fermentation process. Bacteriocin-resistance allows for the utilization of increased concentrations of bacteriocins, such as nisin, which is believed to enhance the metabolic activity of the culture and consequently increase the uptake of sulfur-containing compounds during production of flavor compounds during fermentation.

The bacteriocin-resistant culture is a bacteriocin-resistant organism, such as a yeast from the genera *Debaromyces* or *Kluyeromyces*, or a bacteria from the genera *Brevibacterium* that converts a sulfur-containing substrate to organoleptically potent sulfur-containing flavor compounds, and, preferably, the culture converts methionine to methanethiol by utilizing the enzyme methionine-gamma-lyase. If desired, a microorganism genetically modified so as to provide similar *Brevibacterium* activity can be used in place of a *Brevibacterium* culture. For purposes of this invention, such a genetically modified microorganism is considered to be included within the term "*Brevibacterium* culture." Preferably, the culture is a bacteriocin-resistant *Brevibacterium linens* culture, and, more preferably, the culture is a nisin-resistant *Brevibacterium linens* American Type Culture Collection (ATCC) No. 9174 culture. The bacteriocin-resistant culture is introduced generally at about $1 \times 10^6$ to about $5 \times 10^9$, preferably about $1 \times 10^8$ inoculum.

Where the bacteriocin source is nisin or a nisin-producing culture, the nisin source or nisin-producing culture is added in sufficient amounts that the final concentration of nisin in the second mixture undergoing fermentation is at least about 50 IU/g (i.e., about 1.25 ppm), particularly about 100 to about 500 IU/g (i.e., about 2.5 to about 12.5 ppm), and more particularly about 140 to about 160 IU/g (i.e., about 3.5 to about 4 ppm).

The sulfur-containing substrate is added, either before, after, or both before and after the first heating step, in sufficient amounts that the final concentration of sulfur-containing substrate in the second mixture undergoing fermentation is 0.01 to 2 percent.

Fermentation is then continued for about 10 to about 120 hours, preferably for about 30 to about 50 hours, at a temperature of about 20 to about 30° C., preferably about 24 to about 28° C. Preferably, the second mixture is subject to aeration during fermentation to prevent anaerobic conditions and to provide good mixing. Aeration is preferably effected using air introduced into the second mixture using a diffusion plate or an in-line air sparger. Generally, conditions should be maintained to minimize phase separation during fermentation although this is not required. If appropriate (i.e., if phase separation occurs), the second mixture can optionally be homogenized after fermentation. The pH of the second mixture following fermentation is about 5 to about 9, preferably about pH 5.8 to about 7.

After completion of the fermentation stage, the culture is inactivated by heating to about 63 to about 88° C. for about 16 seconds to about 30 minutes, preferably to about 74° C. for about 16 seconds. Preferably, the second mixture is recirculated during inactivation to improve heat transfer.

Homogenization may be used before fermentation, after fermentation, or both. Homogenization may be conducted using known procedures. Preferably homogenization is carried out at about 1000 to about 5000 psi. Homogenization does not affect the outcome of the fermentation but enhances the stability of the substrate matrix (flavor component) over shelf-life.

For purposes of this invention, the "sulfur-containing substrates" are sulfur-containing free amino acids, dipeptides, tripeptides containing sulfur-containing amino acids, and protein hydrolystates containing sulfur-containing amino acids. Suitable food protein hydrolysates are available, for example, from Quest International (Hoffman Estates, Illinois) under tradenames N-Z-Amine, N-Z-Case, Hy-Case, and Pepticase, as well as from other suppliers. Preferably, the sulfur-containing substrates includes L-methionine, L-glutathione, and L-cysteine. In especially preferred embodiments, the sulfur-containing substrate is a mixture of L-methionine and L-glutathione, a mixture of L-methionine and L-cysteine, or a mixture of L-methionine, L-glutathione, and L-cysteine. The sulfur-containing substrates are generally added at a level of about 0.01 to about 1 percent.

After the heat inactivation step, the cheddar flavor component can be used alone or can be combined with flavor components known in the art to provide the desired highly flavored cultured cheese concentrate. Preferably, the cultured cheese concentrate of this invention contains about 0.1 to about 10 percent of the cheddar flavor component. The cultured cheese concentrate can be a physical blend of flavor components, which blend is then used to prepare the desired flavored cheese. Alternatively, the cultured cheese concentrate can be formed by individually adding flavor components to the cheese substrate; the resulting composition is then used to prepare the desired flavored cheese. Generally, the resulting cheeses contain about 0.1 to 50 percent of the cultured cheese concentrate, preferably 1 to 10 percent of the cultured cheese concentrate.

The cheddar flavor component can be added to a milk substrate, which is then used to form a cheese. Alternatively, the cheddar flavor component can be added to an already prepared cheese base. Generally, the resulting cheeses contain 0.1 percent to about 10 percent of the flavor component and preferably about 1.0 percent to about 6 percent thereof. Of course, as those skilled in the art will realize, the amount of the flavor components can be modified and/or optimized to achieve a particularly desired flavor profile. Additionally, the cheddar flavor component can be used in various cheese bases (e.g., process cheeses (particularly American-style process cheeses), process cheese-type food products, cheese sauces, natural cheeses, cream cheeses, cottage cheeses, and the like).

The sulfur-containing substrates are added to assist in the production of sulfur compounds important in cheddar, especially sharp cheddar, flavor development. Preferred sulfur-containing substrates include L-methionine, L-glutathione, L-cysteine, and mixtures thereof. The L-methionine is used for sulfur compound generation through the action of the *Brevibacterium* culture or the yeast (a *Brevibacterium linens* culture is preferred). The tri-peptide L-glutathione (i.e., glutamine-cysteine-glycine) and the amino acid L-cysteine, in addition to serving as substrates, also act as processing aids to create redox equilibrium conditions which facilitate flavor production by the generation of desirable sulfur flavor compounds (i.e., methanethiol, dimethyldisulfide, and dimethyltrisulfide). Hydrolysis of L-glutathione to free amino acids by microbial enzymes is expected during the fermentation period. Further hydrolysis may also occur during subsequent heat treatment (i.e., during inactivation and/or incorporation into cheese base). By way of example, the use of a *Brevibacterium* culture to generate volatile sulfur compounds (VSC) from the sulfur-containing substrate L-methionine takes place optimally at pH 7, with less than 20 percent of this activity occurring at pH's less than 5.8. At pH 5.8 to 6, Brevibacterium linens is capable of producing significant levels of VSC. However, in reaction mixture systems such as described in U.S. Pat. No. 6,406,724, conducting the fermentation at pH's above 5.8 would greatly increase the risk of contamination from spoilage microorganisms.

The resulting cheddar component that is produced is typically a liquid or paste with a moisture content in the range of from about 40 to about 80 percent, preferably from about 46 to about 50 percent. The cheddar component can be spray dried to provide a powder with or without the addition of carrier materials, such as whey concentrate or maltodextrins. The cheddar component generally has comparable characteristics to the sulfury-cheddar component in U.S. Pat. No. 6,406,724, and reference is made thereto. The cheddar component likely contains other potent aroma or flavor compounds, including sulfur-containing compounds, which have not been detected.

The cheddar component prepared according to this invention develops the cheddar flavor characteristics within a shorter period of time than the cheddar components prepared using the methods described in U.S. Pat. No. 6,406,724. In particular, the cheddar flavor component of this invention can be prepared to have a commercially suitable flavor developed within about 24 to 120 hours, instead of the typical minimum of about 8 days required to achieve comparable flavor development in the cheddar component made according to the methods described in U.S. Pat. No. 6,406,724.

The addition of the bacteriocin source and the salt level in the reaction mixture used for making the cheddar component permits adjustment upward to higher pH's of approximately 6 or even higher during fermentation such that flavor development can be accelerated yet without a problem arising from the outgrowth of undesirable food spoilage microorganisms at the higher pH conditions. Use of this technology permits for the production of similar levels of VSC in the cheddar flavor component within an accelerated period of time as compared to similar preparation schemes that omit the bacteriocin source and high salt levels.

In an alternative aspect of the invention, the process of the present invention may be carried out in an aseptic system, thus eliminating the need for bacteriocins and salt in the first or second mixture, as well as eliminating the heat treatment and cooling steps prior to fermentation. Necessarily, the components of the first mixture are sterilized prior to addition to the aseptic system. About 1 to about 8 percent protein, about 25 to about 70 percent fat, and about 0.01 to about 2 percent sulfur-containing substrate are added to the aseptic system to form a sterile first mixture. The sterile first mixture is treated with a bacteriocin-resistant culture to form a second mixture, whereby the bacteriocin-resistant culture is effective for converting the sulfur-containing substrate to sulfur-containing flavor compounds. The second mixture is treated at a temperature sufficient to inactivate the culture to form the flavor component.

The following examples further illustrate various features of the invention, but are intended to in no way limit the scope of the invention as set forth in the appended claims. Unless otherwise noted, all percentages and ratios are by weight. All references cited in the present specification are hereby incorporated by reference.

EXAMPLE 1

This example illustrates the preparation of a rapidly produced cheddar type component as a flavor concentrate. A first mixture is prepared by combining 42 percent fat sweet cream (90 percent of formula and the primary lipid and protein source), non-fat dry milk (2 percent of formula), sodium chloride (8 percent of formula), L-methionine (0.2 percent of formula), and NISAPLIN® from Danisco (0.015 percent of formula). The resulting first mixture is 48 percent moisture, 39 percent fat, 2.5 percent protein and has a pH of 6.0. The resulting first mixture is then high temperature heat treated at 122° C. for 30 seconds by direct steam injection, and then is cooled to 25° C. The resulting intermediate product is used to prepare the specific flavoring components of these examples using a single-stage fermentation procedure.

*Brevibacterium linens* ATCC No. 9174 is obtained from American Type Culture Collection. This strain was made nisin resistant by sequentially growing it in tryptic soy broth (TSB) containing higher concentrations of nisin. A culture resistant to 350 U nisin/ml was obtained and stored frozen in TSB and glycerol until used.

The *Brevibacterium* culture is grown in BL media from Danisco containing 0.1 percent methionine and 350 U nisin/ml (NISAPLIN® from Danisco) in a fermentor at 25° C. for 48 hours with aeration. The culture is concentrated by centrifugation, blended with non-fat dry milk and glycerol in the ratio of 1:0.4:2.4. The cultures are stored frozen in liquid nitrogen until used. The Brevibacterium linens culture (0.1 percent and/or $1 \times 10^8$ cfu/ml) is added to the fermentation vessel to begin the fermentation process. The fermentation mixture is then aerated at a temperature of 25° C. for a total of 40 hours. The pH of the fermentation mixture at the end of the fermentation is 6.0. The resulting rapidly produced cheddar flavor component is heated to 74° C. for 16 seconds to inactivate the cultures and extend the shelf life of the product. After heat inactivation, the rapidly produced cheddar type component has a composition of 52 percent solids, 48 percent moisture. It also has 6.0 ppm methanthiol, 0.5 ppm dimethyldisulfide (DMDS,) and 0.2 ppm dimethyltrisulfide. This rapidly produced cheddar flavor component can be dried or concentrated by removing water to form a flavor paste or a flavor powder. It was found that using a sweet cream base, with the addition of salt and NISAPLIN®, gives a flavor profile that has at least comparable flavor characteristics to a cheddar component made according to Example 1 of U.S. Pat. No. 6,406,724.

A reducing agent, such as L-glutathione or L-cysteine, can be added pre- or post-fermentation at 0.01 to 0.3 percent to stabilize the volatile sulfur compounds produced.

EXAMPLE 2

Figure 2:
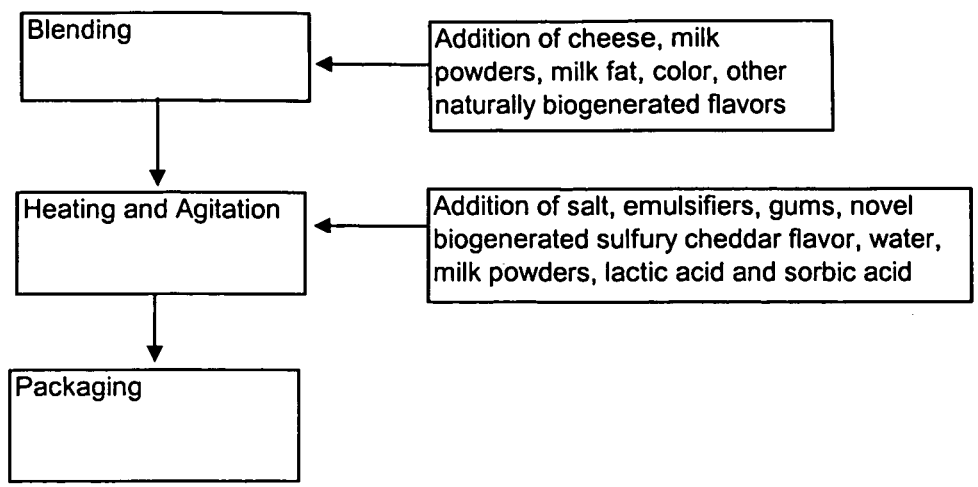
FIG. 2 illustrates the preparation of a processed cheese product containing a cheese flavor component of an embodiment of the present invention.

As shown in FIG. 2, a processed cheese is prepared using the flavor component prepared according to Example 1. A mixture containing 25 pounds cheddar cheese, 49 pounds water, 18 pounds naturally biogenerated cheese flavor (as described in U.S. Pat. No. 6,406,724 and incorporated herein), 2 pounds enzyme modified fresh cheese (as described in U.S. Pat. No. 6,251,445 and incorporated herein), 18 pounds milk fat, 0.1 pounds cheese color, 42 pounds milk protein concentrate, 13 pounds whey protein concentrate, and 3 pounds calcium phosphate are combined to form a pre-blend. Approximately 47 pounds of the pre-blend, 0.1 pounds sorbic acid, 2 pounds emulsifying salts, 1 pound sodium chloride, and 0.1 pounds sodium alginate are added to the steam injected processor under agitation. Next the flavor component of Example 1 is added at 1 pound. The product is heated to 74° C. and held for 60 seconds. Then, 7 pounds water, 1 pounds dry whey, 2 pounds milk protein concentrate and 4 pounds whey protein concentrate are added to the processor and the mixture is heated to 78° C. Lactic acid is added at 0.3 pounds. Finally, the processed cheese is held at 78° C. for 90 seconds and then is packaged.

EXAMPLE 3

Figure 3:
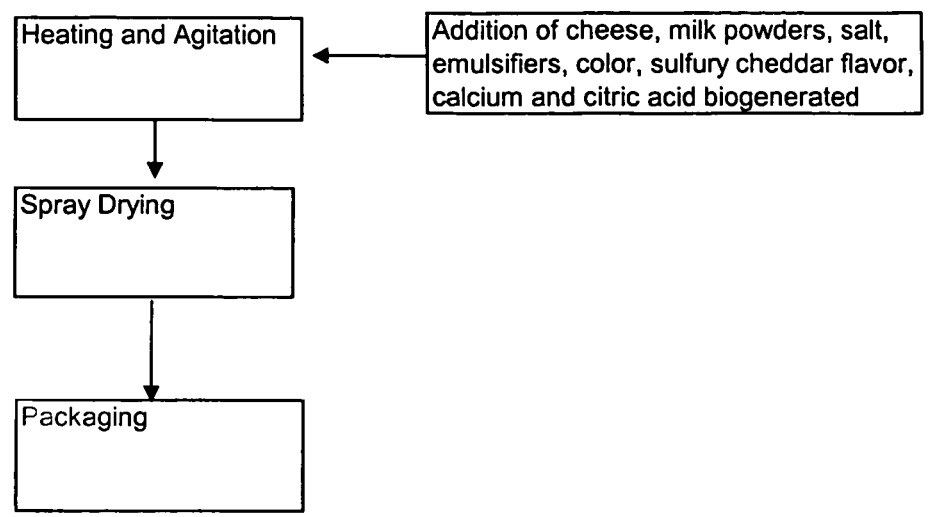
FIG. 3 illustrates the preparation of a cheese powder containing a cheese flavor component according to an embodiment of the present invention.

As shown in FIG. 3, a dry cheese powder is produced using the cheddar flavor component produced according to Example 1. A blend containing 20 pounds soft, unripened cheese, 4 pounds enzyme-modified cheeses, and 1 pound cheddar flavor component produced according to Example 1 is added to the steam injected processor under agitation. Next, 1 pounds sodium chloride, 2 pounds emulsifying salts, and 1 pound calcium salt are added to the processor. The mixture is heated to 79° C. and then 0.1 pounds color, 30 pounds dry whey, 25 pounds water, and 1 pound citric acid are added to the mixture. The blend is heated to 88° C. and held for 120 seconds. The mixture is spray dried before packaging.

EXAMPLE 4

This example illustrates the preparation of a rapidly produced cheddar type component as a flavor concentrate. Production of a cheddar type component is conducted generally in accordance with the process shown in FIG. 1.

A substrate was prepared by combining 42 percent fat sweet cream (90 percent of formula and the primary lipid and protein source), non-fat dry milk (2 percent of formula), sodium chloride (8 percent of formula), xanthan gum (0.05 percent of formula), a lipase composed of a blend of animal derived esterases (0.4 percent of formula), L-methionine (0.2 percent of formula), and NISAPLIN® from Danisco (0.015 percent of formula). The resulting mixture has a composition of 48 percent moisture, 39 percent fat, and 2.5 percent protein and has a pH of 6.0.

The resulting mixture can optionally be homogenized (1200-2000 psi) prior to further treatment. The mixture is high temperature heat-treated at 122° C. for 30 seconds by direct steam injection and then is cooled to 25° C. The resulting intermediate product is used to prepare the specific flavoring components of these examples using a single-stage fermentation procedure A culture of *Brevibacterium linens* (0.1 percent and/ or 1×10$^8$ cfu/ml) is added to the fermentation vessel to begin the fermentation process. Prior to its use, the *Brevibacterium linens* culture is grown at 25° C. for 48 hours. The fermentation mixture is then aerated at a temperature of 25° C. for a total of 40 hours. The pH of the fermentation mixture at the end of fermentation is 6.0.

The resulting rapidly produced cheddar type component can optionally be homogenized at 1500 psi before heating to 74° C. for 16 seconds to inactivate the cultures and extend the shelf-life of the product. After heat inactivation, the rapidly produced cheddar type component has a composition of 52 percent solids and 48 percent moisture. It also has 6.0 ppm methanthiol (MeSH), 0.5 ppm dimethyldisulfide (DMDS), and 0.2 ppm dimethyltrisulfide (DMTS). This rapidly produced cheddar flavor component may be evaporated or otherwise concentrated to form a flavor paste or a flavor powder.

It was found that using a sweet cream base, with the addition of salt and NISAPLIN®, gave a flavor profile that had at least comparable flavor characteristics to a sulfury-cheddar component made according to Example 1 of U.S. Pat. No. 6,406,724.

While the invention has been particularly described with specific reference to particular process and product embodiments, it will be appreciated that various alterations, modifications, and adaptations may be based on the present disclosure, and are intended to be within the spirit and scope of the present invention as defined by the following claims:

What is claimed is:

1. A method for preparing a flavor component, said method comprising:
   preparing a first mixture comprising about 1 to about 8 percent protein, 36 to about 70 percent fat, about 0.01 to about 2 percent sulfur-containing substrate, about 6 to about 10 percent salt, and a bacteriocin source, wherein the first mixture has a pH of about 5.8 to about 9;
   subjecting the first mixture to an ultra high temperature treatment at a temperature of at least about 135° C. for about 2 to about 15 seconds;
   cooling the heated first mixture to about 20 to about 30° C.;
   treating the cooled first mixture with a bacteriocin-resistant culture to form a second mixture, whereby the bacteriocin-resistant culture is effective for converting the sulfur-containing substrate to sulfur-containing flavor compounds, and the bacteriocin-resistant culture being resistant to 350 U nisin/ml, and
   treating the second mixture at a temperature sufficient to inactivate the culture in the second mixture to form the flavor component.

2. The method according to claim 1, wherein the fat is selected from the group consisting of concentrated milk fat, anhydrous milk fat, butter, cream, sweet cream, vegetable oil, canola oil, or mixtures thereof.

3. The method according to claim 1, wherein the protein is selected from the group consisting of milk protein concentrate, fractionated milk protein, concentrated milk fat, whey protein concentrate, dried whey, non-fat dry milk, milk protein isolate, whey protein isolate, soy protein, corn protein, wheat protein, rice protein, and mixtures thereof.

4. The method according to claim 1, wherein the bacteriocin source is selected from the group consisting of nisin A, nisin Z, pediocin, lactosin, lactacins, carnocin, enterocin, plantaricin, subtilin, epidermin, cinnamycin, duramycin, ancovenin, and any combinations thereof.

5. The method according to claim 1, wherein the bacteriocin source is nisin in an amount of about 100 to about 500 IU/g.

6. The method according to claim 5, wherein the bacteriocin source is nisin in an amount of about 140 to about 160 IU/g.

7. The method according to claim 1, wherein the sulfur-containing substrate is selected from the group consisting of L-methionine, L-glutathione, and L-cysteine, or mixtures thereof.

8. The method according to claim 1, wherein flavor component is treated to form a flavor powder.

9. The method according to claim 1, wherein the flavor component is treated to form a flavor paste.

10. The method according to claim 1, wherein the bacteriocin-resistant culture is a bacteriocin-resistant *Brevibacterium linens* culture.

11. The method according to claim 10, wherein the bacteriocin-resistant *Brevibacterium linens* culture is derived from *Brevibacterium linens* ATCC No. 9174.

12. A method for preparing a flavor component, said method comprising:
   preparing a first mixture comprising about 1 to about 8 percent protein, 36 to about 70 percent fat, about 6 to about 10 percent salt, wherein the first mixture has a pH of about 5.8 to about 9;

subjecting the first mixture to an ultra high temperature treatment at a temperature of at least about 135° C. for about 2 to about 15 seconds;
cooling the heated first mixture to about 20 to about 30° C.;
treating the cooled first mixture with about 0.01 to about 2 percent sterile sulfur-containing substrate, a sterile bacteriocin source, and a bacteriocin-resistant culture to form a second mixture, whereby the bacteriocin-resistant culture is effective for converting the sulfur-containing substrate to sulfur-containing flavor compounds, and the bacteriocin-resistant culture being resistant to 350 U nisin/ml; and
treating the second mixture at a temperature sufficient to inactivate the culture in the second mixture to form the flavor component.

13. The method according to claim 12, wherein the sterile bacteriocin source is selected from the group consisting of nisin A, nisin Z, pediocin, lactosin, lactacins, carnocin, enterocin, plantaricin, subtilin, epidermin, cinnamycin, duramycin, ancovenin, and any combinations thereof.

14. The method according to claim 12, wherein the sterile bacteriocin source is nisin in an amount of about 100 to about 500 IU/g.

15. The method according to claim 12, wherein the sterile bacteriocin source is nisin in an amount of about 140 to about 160 IU/g.

16. A method for preparing a flavor component, said method comprising:
preparing a first mixture comprising about 1 to about 8 percent protein, 36 to about 70 percent fat, about 6 to about 10 percent salt, a sulfur-containing substrate, and a bacteriocin source, wherein the first mixture has a pH of about 5.8 to about 9;
subjecting the first mixture to an ultra high temperature treatment at a temperature of at least about 135° C. for about 2 to about 15 seconds;
cooling the heated first mixture to about 20 to about 30° C.;
treating the cooled first mixture with a sterile sulfur-containing substrate, a sterile bacteriocin source, and a bacteriocin-resistant culture to form a second mixture, whereby the bacteriocin-resistant culture is effective for converting the sulfur-containing substrate to sulfur-containing flavor compounds, and the bacteriocin-resistant culture being resistant to 350 U nisin/ml; and
treating the second mixture at a temperature sufficient to inactivate the culture in the second mixture to form the flavor component.

17. The method according to claim 16, wherein the sterile sulfur-containing substrate is selected from the group consisting of nisin A, nisin Z, pediocin, lactosin, lactacins, carnocin, enterocin, plantaricin, subtilin, epidermin, cinnamycin, duramycin, ancovenin, and any combinations thereof.

18. The method according to claim 16, wherein the second mixture contains nisin in an amount of about 100 to about 500 IU/g.

19. The method according to claim 16, wherein the second mixture contains nisin in an amount of about 140 to about 160 IU/g.

20. The method according to claim 16, wherein the sulfur-containing substrate is added in the amount of about 0.01 to about 2 percent.

21. A food product comprising a flavor component, wherein the flavor component is prepared by a process comprising:
preparing a first mixture comprising about 1 to about 8 percent protein, 36 to about 70 percent fat, about 0.01 to about 2 percent sulfur-containing substrate, about 6 to about 10 percent salt, and a bacteriocin source, wherein the first mixture has a pH of about 5.8 to about 9;
subjecting the first mixture to an ultra high temperature treatment at a temperature of at least about 135° C. for about 2 to about 15 seconds;
cooling the heated first mixture to about 20 to about 30° C.;
treating the cooled first mixture with a bacteriocin-resistant culture to form a second mixture, whereby the bacteriocin-resistant culture is effective for converting the sulfur-containing substrate to sulfur-containing flavor compounds, and the bacteriocin-resistant culture being resistant to 350 U nisin/ml; and
treating the second mixture at a temperature sufficient to inactivate the culture in the second mixture to form the flavor component.

22. The food product of claim 21, wherein the fat is selected from the group consisting of concentrated milk fat, anhydrous milk fat, butter, cream, sweet cream, vegetable oil, canola oil, and mixtures thereof.

23. The food product of claim 21, wherein the protein is selected from the group consisting of milk protein concentrate, fractionated milk protein, concentrated milk fat, whey protein concentrate, dried whey, non-fat dry milk, milk protein isolate, whey protein isolate, soy protein, corn protein, wheat protein, rice protein, and mixtures thereof.

24. The food product of claim 21, wherein said food product comprises about 0.1 to about 10.0 weight percent of said flavor component.

25. The food product of claim 21, wherein said food product comprises a cheese base.

26. The food product of claim 25, wherein the food product comprises a cheese base selected from process cheese, process cheese-type food products, cheese sauce, natural cheese, cream cheese, and cottage cheese.

27. The food product of claim 21, wherein the bacteriocin source is selected from the group consisting of nisin A, nisin Z, pediocin, lactosin, lactacins, carnocin, enterocin, plantaricin, subtilin, epidermin, cinnamycin, duramycin, ancovenin, and any combinations thereof.

28. The food product of claim 21, wherein nisin is present in an amount of about 50 to about 500 IU/g.

29. The food product of claim 21, wherein the sulfur-containing substrate is selected from the group consisting of L-methionine, L-glutathione, and L-cysteine, and mixtures thereof.

30. The food product of claim 21, wherein the flavor component is treated to form a flavor powder.

31. The food product of claim 21, wherein the flavor component is treated to form a flavor paste.

32. A flavor component for use in food products, wherein the flavor component is prepared by a method comprising:
preparing a first mixture comprising about 1 to about 8 percent protein, 36 to about 70 percent fat, about 0.01 to about 2 percent sulfur-containing substrate, about 6 to about 10 percent salt, and a bacteriocin source, wherein the first mixture has a pH of about 5.8 to about 9;
subjecting the first mixture to an ultra high temperature treatment at a temperature of at least about 135° C. for about 2 to about 15 seconds;
cooling the heated first mixture to about 20 to about 30° C.;
treating the cooled first mixture with a bacteriocin-resistant culture to form a second mixture, whereby the bacteriocin-resistant culture is effective for converting the sulfur-containing substrate to sulfur-containing flavor compounds, and the bacteriocin-resistant culture being resistant to 350 U nisin/ml; and treating the second mixture at a temperature sufficient to inactivate the culture in the second mixture to form the flavor component.

33. The flavor component according to claim 32, wherein the fat is selected from the group consisting of concentrated milk fat, anhydrous milk fat, butter, cream, sweet cream, vegetable oil, canola oil, and mixtures thereof.

34. The flavor component according to claim 32, wherein the protein is selected from the group consisting of milk protein concentrate, fractionated milk protein, concentrated milk fat, whey protein concentrate, dried whey, non-fat dry milk, milk protein isolate, whey protein isolate, soy protein, corn protein, wheat protein, rice protein, and mixtures thereof.

35. The flavor component according to claim 32, wherein the bacteriocin source is selected from the group consisting of nisin A, nisin Z, pediocin, lactosin, lactacins, carnocin, enterocin, plantaricin, subtilin, epidermin, cinnamycin, duramycin, ancovenin, and any combinations thereof.

36. The flavor component according to claim 32, wherein nisin is present in an amount of about 50 to about 500 IU/g.

37. The flavor component according to claim 32, wherein the sulfur-containing substrate is selected from the group consisting of L-methionine, L-glutathione, and L-cysteine, and mixtures thereof.

38. The flavor component according to claim 32, wherein flavor component is treated to form a flavor powder.

39. The flavor component according to claim 32, wherein the flavor component is treated to form a flavor paste.

40. A method for preparing a flavored cheese using a cultured cheese concentrate, said method comprising:
(1) preparing a cheese or dairy base;
(2) incorporating about 0.1 to about 50 percent of a cultured cheese concentrate into the cheese or dairy base to form the flavored cheese;
wherein the cultured cheese concentrate comprises 0.1 to about 10 percent of a flavor component; and
wherein the flavor component is prepared by a process comprising:
preparing a first mixture comprising about 1 to about 8 percent protein, 36 to about 70 percent fat, about 0.01 to about 2 percent sulfur-containing substrate, about 6 to about 10 percent salt, and a bacteriocin source, wherein the first mixture has a pH of about 5.8 to about 9;
subjecting the first mixture to an ultra high temperature treatment at a temperature of at least about 135° C. for about 2 to about 15 seconds;
cooling the heated first mixture to about 20 to about 30° C.;
treating the cooled first mixture with a bacteriocin-resistant culture to form a second mixture, whereby the bacteriocin-resistant culture is effective for converting the sulfur-containing substrate to sulfur-containing flavor compounds, and the bacteriocin-resistant culture being resistant to 350 U nisin/ml; and
treating the second mixture at a temperature sufficient to inactivate the culture in the second mixture to form the flavor component.

41. The method according to claim 40, wherein the fat is selected from the group consisting of concentrated milk fat, anhydrous milk fat, butter, cream, sweet cream, vegetable oil, canola oil, and mixtures thereof.

42. The method according to claim 40, wherein the protein is selected from the group consisting of milk protein concentrate, fractionated milk protein, concentrated milk fat, whey protein concentrate, dried whey, non-fat dry milk, milk protein isolate, whey protein isolate, soy protein, corn protein, wheat protein, rice protein, and mixtures thereof.

43. The method according to claim 40, wherein the bacteriocin source is selected from the group consisting of nisin A, nisin Z, pediocin, lactosin, lactacins, carnocin, enterocin, plantaricin, subtilin, epidermin, cinnamycin, duramycin, ancovenin, and any combinations thereof.

44. The method according to claim 40, wherein the bacteriocin source is present in an amount of about 50 to about 500 IU/g.

45. The method according to claim 40, wherein the sulfur-containing substrate is selected from the group consisting of L-methionine, L-glutathione, and L-cysteine, or mixtures thereof.

46. The method according to claim 40, wherein flavor component is treated to form a flavor powder.

47. The method according to claim 40, wherein the flavor component is treated to form a flavor paste.

48. A method for preparing a flavor component in a non-aseptic system, said method comprising:
preparing a first mixture comprising about 1 to about 8 percent protein, 36 to about 70 percent fat, about 0.01 to about 2 percent sulfur-containing substrate, about 6 to about 10 percent salt, and a bacteriocin source, wherein the first mixture has a pH of about 5.8 to about 9;
subjecting the first mixture to an ultra high temperature treatment at a temperature of at least about 135° C. for about 2 to about 15 seconds;
cooling the heated first mixture to about 20 to about 30° C.;
treating the cooled first mixture with a bacteriocin-resistant culture at a pH of about 6 to about 7 to form a second mixture, whereby the bacteriocin-resistant culture is effective for converting the sulfur-containing substrate to sulfur-containing flavor compounds, and the bacteriocin-resistant culture being resistant to 350 U nisin/ml; and
treating the second mixture at a temperature sufficient to inactivate the culture in the second mixture to form the flavor component.

* * * * *